(12) United States Patent
Rastogi et al.

(10) Patent No.: US 8,229,240 B1
(45) Date of Patent: Jul. 24, 2012

(54) TRANSFERRING THE LOOK OF AN IMAGE

(75) Inventors: Anubha Rastogi, Noida UP (IN); Balaji Krishnamurthy, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1519 days.

(21) Appl. No.: 11/710,269

(22) Filed: Feb. 23, 2007

(51) Int. Cl.
| | |
|---|---|
| *G06K 9/40* | (2006.01) |
| *G09G 1/14* | (2006.01) |
| *G09G 3/28* | (2006.01) |
| *G09G 3/30* | (2006.01) |
| *G09G 5/00* | (2006.01) |
| *G09G 5/02* | (2006.01) |
| *G09G 5/10* | (2006.01) |
| *H04N 5/00* | (2011.01) |
| *H04N 9/64* | (2006.01) |
| *H04N 1/60* | (2006.01) |
| *H04N 1/40* | (2006.01) |

(52) U.S. Cl. ......... 382/254; 348/606; 348/251; 358/1.9; 358/447; 358/461; 358/463; 382/261; 382/274; 345/20; 345/63; 345/77; 345/581; 345/596; 345/690

(58) Field of Classification Search .................... None
See application file for complete search history.

(56) References Cited

U.S. PATENT DOCUMENTS

| 7,035,456 B2* | 4/2006 | Lestideau ................. 382/164 |
| 7,352,910 B2* | 4/2008 | Kanamori et al. ........... 382/254 |
| 2005/0111740 A1* | 5/2005 | Sakuyama ................. 382/232 |
| 2007/0154096 A1* | 7/2007 | Cao et al. ................. 382/190 |

OTHER PUBLICATIONS

Gonzalez, R. C. et al., Digital Image Processing, Second Edition, 2002.
Bae, S. et al., Two-scale Tone Management for Photographic Look, Proceedings of ACM Siggraph 2006.
Lischinski, D. et al., Interactive Local Adjustment of Tonal Values, Proceedings of ACM Siggraph 2006.
Starch, J. et al. Gray and Color Image Contrast Enhancement by the Curvelet Transform, IEEE Transactions of Image Processing, vol. 12, No. 6, Jun. 2003.
Reinhard, E. et al., Photographic Tone Reproduction for Digital Images. ACM Trans. On Graphics 21, 3. Proc. Of ACM Siggraph Conference, 2002.

* cited by examiner

*Primary Examiner* — Randolph I Chu
(74) *Attorney, Agent, or Firm* — Fish & Richardson P.C.

(57) ABSTRACT

Systems, methods, and apparatus, including computer program products, are provided for changing the look of an image. In some implementations a computer-implemented method is provided. The method includes decomposing a first image using a first plurality of wavelet transforms, each first wavelet transform creating a first transformation resolution, each first transformation resolution having respective first data, and decomposing a second image using a second plurality of wavelet transforms, each second wavelet transform creating a second transformation resolution, each second transformation resolution having respective second data. The method also includes determining a first measure of texture for each first transformation resolution's respective data, applying each first transformation resolution's first measure of texture to each corresponding second transformation resolution's data, and recomposing the second image based on the modified second transformation resolutions.

30 Claims, 10 Drawing Sheets
(2 of 10 Drawing Sheet(s) Filed in Color)

TRANSFERRING THE LOOK OF AN IMAGE

BACKGROUND

The present disclosure relates to transferring the look of an image to another image. Sometimes it is desirable for an image to be made to look similar to one taken by a master photographer. For example, black and white photographs of California's Yosemite Valley by Ansel Adams use light and shadow to lend a surreal quality to his landscapes. Traditionally, one tries to adjust a target image so that it looks like a model image by manually manipulating the target image's histogram to alter the contrast or brightness of the target image. An image histogram is a distribution of brightness values for an image. For example, a color or black and white image has a brightness (e.g., intensity or luminosity) value associated with each pixel in the image. (Images in color spaces that do not support a brightness value can be converted to a color space that does.) Each pixel's brightness value is used to increment a counter for a histogram corresponding to the distribution of brightness values for the image. Another approach is to perform a histogram matching operation in order to make the target image histogram similar to that of a model image histogram. However, while these techniques adjust the contrast of the image, they fail to appropriately highlight or fade details in the image and hence the look is not matched.

Another approach uses a bilateral filter to split the model and target images each into a smooth base layer and a high frequency detail layer. A histogram matching is performed on the target base layer and detail layer against the corresponding layers of the model image. The modified target layers are then combined together to form the resulting target image. But this approach can be time consuming. Without instant feedback, users may be loathe to use such a solution. Moreover, this technique cannot easily be brought to bear on a real-time sequence of images such as a video feed.

SUMMARY

Systems, methods, and apparatus, including computer program products, are provided for changing the look of an image. In general, one aspect of the subject matter described in this specification can be embodied in a computer-implemented method that includes decomposing a first image using a first plurality of wavelet transforms, each first wavelet transform creating a first transformation resolution, each first transformation resolution having respective first data, and decomposing a second image using a second plurality of wavelet transforms, each second wavelet transform creating a second transformation resolution, each second transformation resolution having respective second data. The method also includes determining a first measure of texture for each first transformation resolution's respective data, applying each first transformation resolution's first measure of texture to each corresponding second transformation resolution's data, and recomposing the second image based on the modified second transformation resolutions. Other embodiments of this aspect include corresponding systems, apparatus, and computer program products.

These and other embodiments can optionally include one or more of the following features. Determining the first measure of texture based on the corresponding first data includes computing an analog of a gradient map based on the corresponding first data and computing a mean based on the analog of a gradient map. The first data includes a plurality of wavelet coefficients. Recomposing the second image includes performing a plurality of inverse wavelet transformations of the second transformation resolutions.

The aspect can further include determining a second measure of texture for each second transformation resolution's respective data, determining a plurality of ratios each based on a first transformation resolution's first measure of texture and a corresponding second transformation resolution's measure of texture, and where applying each first transformation resolution's first measure of texture to each corresponding second transformation resolution's data includes applying each ratio to a corresponding second transformation resolution's data.

These and other embodiments can optionally include one or more of the following features. Determining a plurality of ratios includes computing an analog of a gradient map for each second transformation resolution based on the corresponding second transformation resolution's data, and performing a histogram match of each first transformation resolution's first measure of texture onto a corresponding second transformation resolution's second measure of texture. For each element of the analog of the gradient map of each second transformation resolution, the method also identifies a first value and a second value, the first value being the value of the element before the histogram match was performed, the second value being the value of the element after the histogram match was performed. For each first value of each second transformation resolution, the method also computes a ratio based on the first value and on a corresponding second value. For each second transformation resolution, the method computes an average of the corresponding ratios. Determining a plurality of ratios includes computing a first analog of a gradient map for each first transformation resolution based on the corresponding first transformation resolution's data, computing a second analog of a gradient map for each second transformation resolution based on the corresponding second transformation resolution's data, computing a first mean for each first analog of a gradient map, computing a second mean for each second analog of a gradient map, and for each first mean, computing a first ratio based on the corresponding first and second means.

The aspect can further include performing a histogram match of each first transformation resolution's first measure of texture onto a corresponding second transformation resolution's second measure of texture. For each element of the second analog of the gradient map of each second transformation resolution, the method also identifies a first value and a second value, the first value being the value of the element before the histogram match was performed, the second value being the value of the element after the histogram match was performed. For each first value of each second transformation resolution, the method also computes a second ratio based on the first value and on a corresponding second value. For each second transformation resolution, the method also computes an average of the corresponding second ratios. For each second transformation resolution, the method also selects the larger of either the corresponding first ratio or the corresponding second ratio.

The aspect can further include transferring a global tonal balance from the first image to the second image.

The aspect can further include decomposing a third image using a third plurality of wavelet transforms, each third wavelet transform creating a third transformation resolution, each third transformation resolution having respective third data, and applying each first transformation resolution's first measure of texture to each corresponding third transformation resolution's data.

The aspect can further include recomposing the third image based on the modified third transformation resolution.

Particular implementations of the subject matter described in this specification can be implemented to realize one or more of the following advantages. The look of a model image are transferred onto a target image in a time efficient manner, without using an excess of memory. Because the transfer is accomplished in an extremely time-efficient manner, such transfers are user friendly since users are provided instant feedback. Moreover, this technique can be applied to video frames in close to real-time. The transfer technique can be fully automatic or allow users some level of control to experiment with different parameters. Target images can be modified without introducing halos or gradient reversals. Another advantage is that an image can be enhanced without overemphasizing noise.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1A:
FIGS. 1A, 1B and 1C illustrate transferring the look of a model image onto a target image.
Figure 1B:
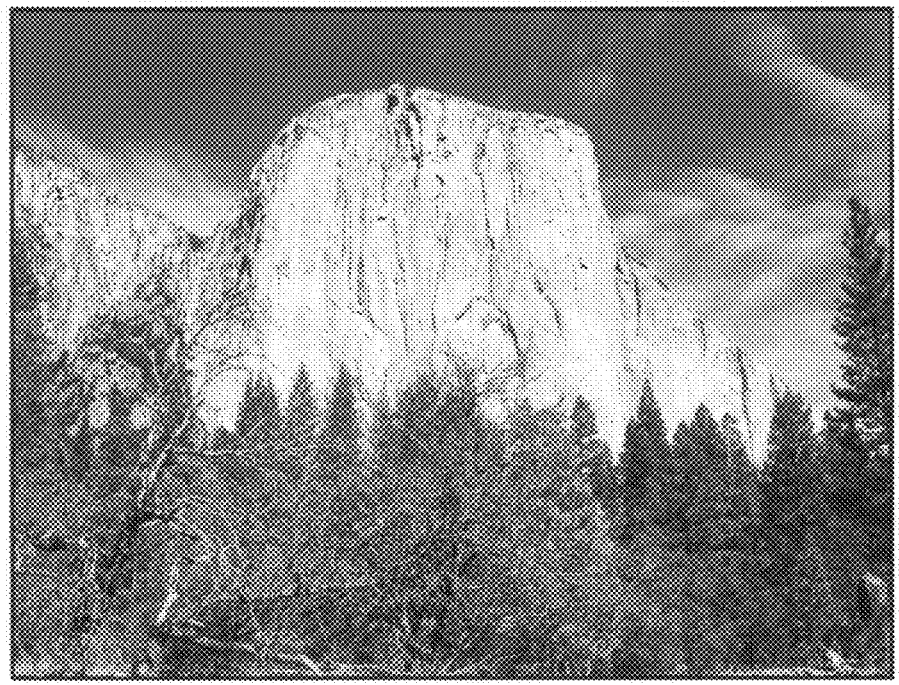
Figure 1C:
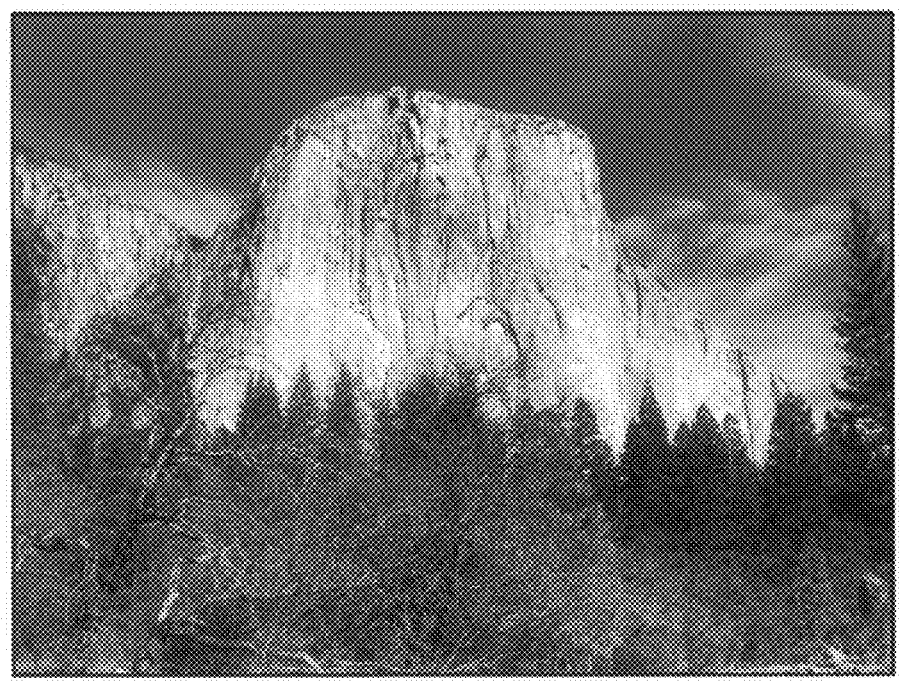

FIGS. 1A, 1B and 1C illustrate transferring the look of a model image onto a target image. FIG. 1A is an example of a model image the look of which will be transferred to a target image shown in FIG. 1B to create the resulting image shown in FIG. 1C. In various implementations, the look of an image is defined by texture in the image. Generally speaking, texture in the target image is adjusted to make it resemble that of the model image.

Texture represents the frequency of change or level of detail in the image and is manifest as edges. An image with a high amount of detail contains a large number of edges. For example, an image of a wrinkled face contains many edges to represent the wrinkles, while an image of a baby's face contains fewer edges, and hence, less detail, because of the baby's smooth skin. In various implementations, if the model image has a "lower" measure of texture than the target image, details in the target image will be suppressed. Whereas if the model image has a "higher" measure of texture than the target image, details in the target image will be enhanced.

In various implementations, an edge occurs in an image where pixel luminosity in the image noticeably changes. Pixels that make up a color image have color values in a color space. A color space is a mathematical model describing the way colors can be represented numerically, usually as sets of numbers. Many color spaces are possible including CIE L*a*b*; Cyan, Magenta, Yellow and Black (CMYK); Red, Green, Blue (RGB), Hue, Saturation, Value (HSV); and Hue, Saturation, Lightness/Luminance (HSL), for instance. An image in a color space that does not provide luminosity values (e.g., RGB) can be converted to a color space that does (e.g., CIE L*a*b*) or to grayscale using commonly known conversion techniques.

Figure 2:
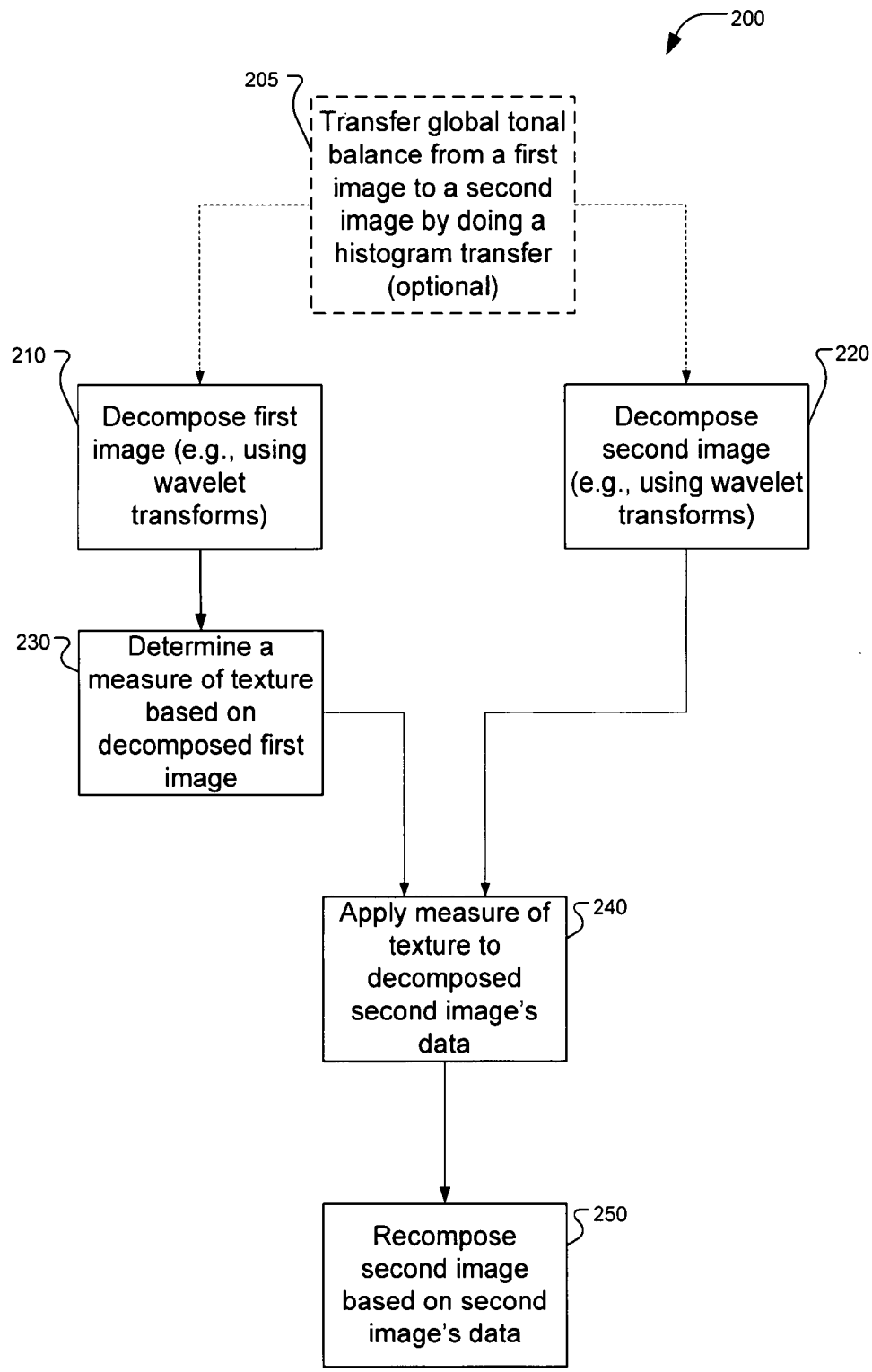
FIG. 2 is a flow diagram of a method for modifying texture in a target image.

FIG. 2 is a flow diagram of a method 200 for modifying texture in a target image. In various implementations, an optional histogram transfer of a model image onto the target image is performed (step 205). The model and target images are both decomposed using multiple discrete wavelet transformations (steps 210 and 220). A measure of texture of the decomposed model image is determined (step 230) and applied to the decomposed target image (step 240). The modified target image is then recomposed (step 250). As a result, the target image's texture will resemble that of the model image.

In some implementations, before decomposing the images, the contrast of a model image is transferred to a target image. For example, a simple histogram transfer of a model image onto the target image is performed, transferring the global tonal balance so that the contrast of the target image is similar to the contrast of the model image.

Figure 3A:
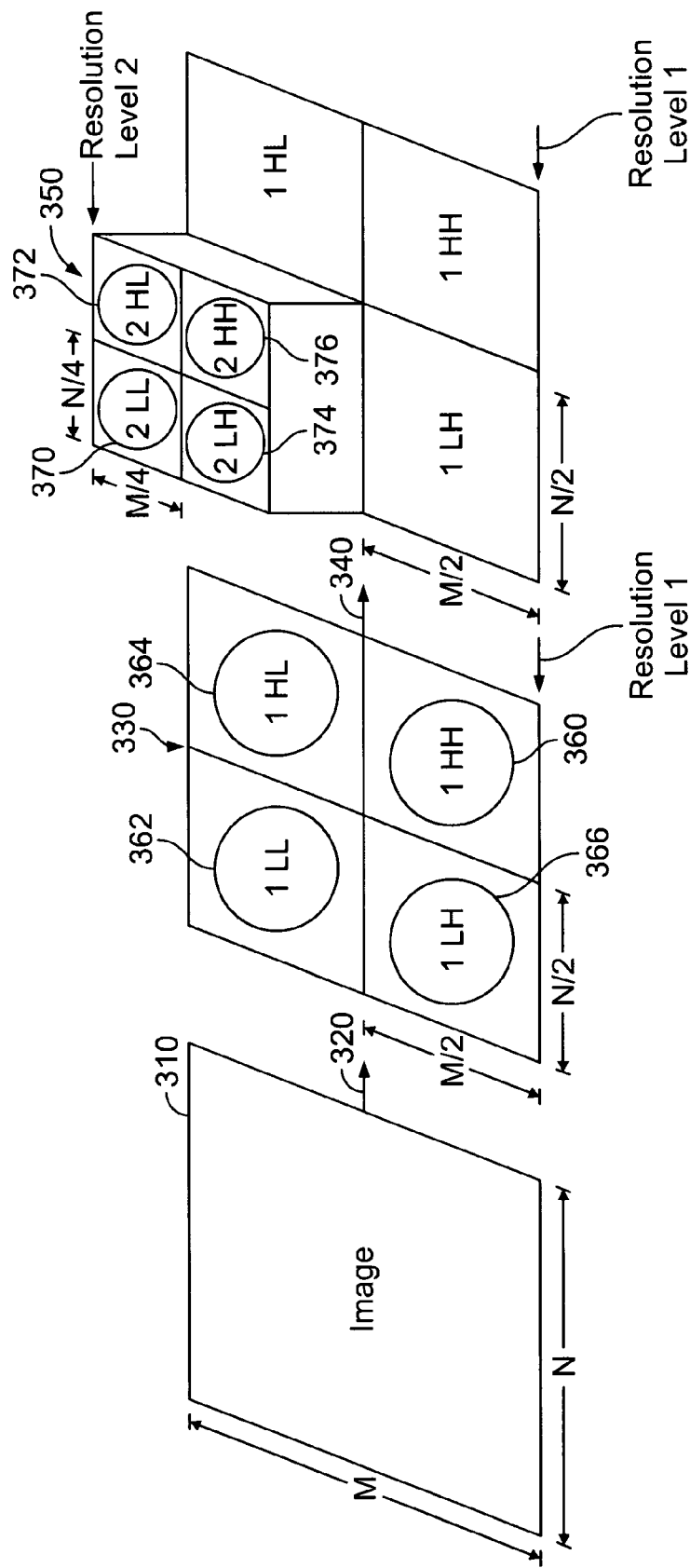
FIG. 3A illustrates decomposition of an image using successive wavelet transformations.
Figure 3B:
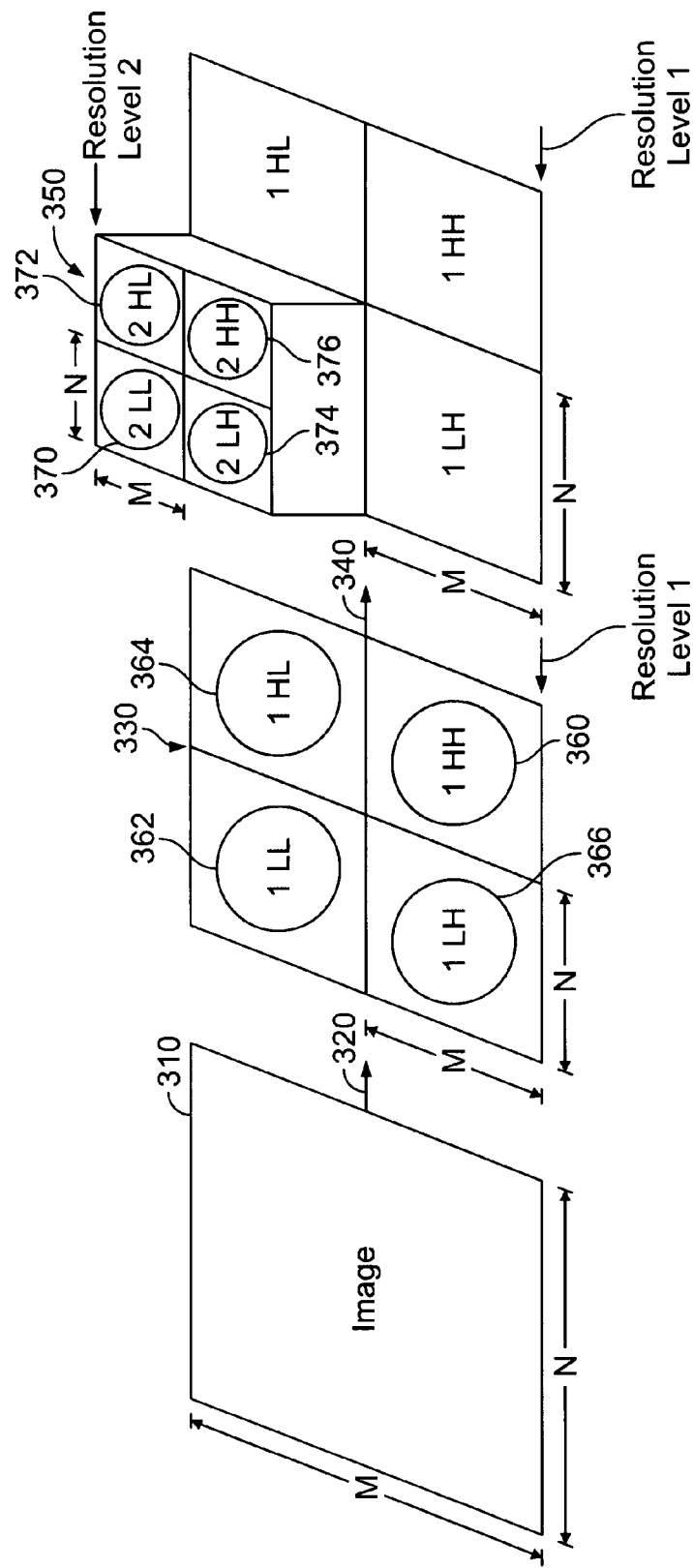
FIG. 3B illustrates decomposition of an image using successive wavelet transformations.

FIGS. 3A and 3B illustrate decomposition of an image 310 using successive discrete wavelet transformations 320 and 340, as called for by steps 210 and 220 of FIG. 2. A wavelet is a function generated by scaling and translating a "mother" wavelet function. Wavelets can be linearly combined to represent signals. A wavelet transformation of a signal reduces the signal to a set of wavelets that are each localized in time and frequency. A discrete wavelet transform is one in which the wavelets are discretely sampled.

The first iteration of the series of wavelet transformations 320 on the image 310 produces a first transformation resolution level 330. The first transformation resolution level 330 includes four sub-bands 360, 362, 364 and 366 and represents taking the image 310 from the spatial domain to the time/frequency domain. Each sub-band includes a plurality of wavelet coefficient values. In some implementations, the image 310 will first have its luminosity channel separated from the chrominance channels, with the first wavelet transformation 320 being applied to the luminosity channel.

The first wavelet transformation 320 on image 310 applies a low pass and a high pass filter to the pixel luminosity values of image 310, sampling the image pixel values (e.g., brightness or intensity values) row by row. The low pass and the high pass filters are then applied to the output of the first set of filters, but on a column by column basis. The high pass filters serve to capture the detail of an image, while the low pass filters serve to suppress the detail of the image.

In some implementations, each low pass and high pass filter produces a number of wavelet coefficients equal to half the number of elements that the filter received as input. For example, sub-band "1HH" 360 includes a number of wavelet coefficients equal to half the number of rows and columns of the original image (i.e., one-fourth of the number of pixel luminosity values), as shown in FIG. 3A. Sub-bands may not be of the same size. Because there may be an odd number of pixels, a sub-band may have extra pixels compared to another sub-band, however. In some implementations, smaller sub-bands can be padded with coefficients of zero to make them the same size as a larger sub-bands. In other implementations, the filters produce outputs that have the same number of elements as their inputs, as shown in FIG. 3B. The "1LL" sub-band is a blurry version of the input image, and each subsequent "LL" sub-band produced in later iterations will be a blurrier version of the input image.

The first transformation resolution level 330 created by applying a wavelet transformation 320 to the original image 310 includes four sub-bands. The "1LL" sub-band 362 includes wavelet coefficients that result from applying the low pass filter on the rows of the image, followed by applying a low pass filter on the columns of the output of the first filter. The "1HL" sub-band 364 includes wavelet coefficients that result from applying the high pass filter on the rows of the image, followed by applying a low pass filter on the columns of the output of the first filter. The "1 LH" sub-band 366 includes wavelet coefficients that result from applying the low pass filter on the rows of the image, followed by applying a high pass filter on the columns of the output of the first filter. The "1HH" sub-band 360 represents wavelet coefficients that result from applying the high pass filter on the rows of the image, followed by applying a high pass filter on the columns of the output of the high pass filter.

A second transformation resolution level 350 is created by applying a wavelet transformation 340 to sub-band "1LL" 362. Sub-band "1LL" is used because that sub-band has suppressed the details found at the current transformation resolution level (i.e., fine edges are suppressed, leaving more gradual edges to work with in subsequent transformation resolution levels). By applying a wavelet transformation to the "1LL" region, the details at a lower resolution can be drawn out (e.g., the details found in the first transformation resolution may include small wrinkles and fine hairs, while the details found at the lower transformation resolution may include the eyes, lips, and nose of the face).

Additional wavelet transformations are similar to what was described for creating the first wavelet transformation resolution level, except that the "LL" sub-band is decomposed (e.g., as shown in FIGS. 3A and 3B, sub-band "1LL" 362 is decomposed instead of the original image) and the input data is no longer in the spatial domain. The second resolution level 350 contains four sub-bands labeled "2LL" 370, "2HL" 372, "2LH" 374, and "2HH" 376. The number "2" in the label represents the decomposition of sub-band "1LL" 362 coefficient values, as opposed to the decomposition of the original image 310's luminosity values. For example, sub-band "2HH" 376 represents wavelet coefficients that result from applying the high pass filter on the rows of the sub-band "1LL" 362, and then on the columns of the output of the high pass filter.

Additional transformation resolution levels for an image can be created to capture texture defined by more gradual edges. In various implementations, successive transformation resolution levels are created until a transformation resolution level cannot be created without having either its number of columns or number of rows being smaller than four. In some implementations where the output of each filter has the same number of elements as the input, the number of transformation resolution levels created is determined by taking the following actions. First, determine the smaller of the number of columns or the number of rows. Second, take the base two logarithm of that number, and subtract two. If the result is greater than zero, then that number of transformation resolution levels will be created, otherwise, none will be created. Each successive transformation resolution is created using the "LL" sub-band of the most recently created transformation resolution level (e.g., the second transformation resolution level is based on sub-band "1LL", the third transformation resolution level is based on sub-band "2LL", and so on).

Except for the most recently created transformation resolution level, a measure of texture for each transformation resolution level of the decomposed model image is determined, as called for in step 230. This will be described below in reference to FIGS. 4 and 5. In some implementations, the measure of texture for a decomposed image at the rth transformation resolution level is determined by computing an analog of a gradient map (see FIGS. 4-5). Analogs of gradients are used to determine texture within an image since they represent changes in luminosity. Each analog of the gradient at a transformation resolution level represents a local measure of texture.

Figure 4:
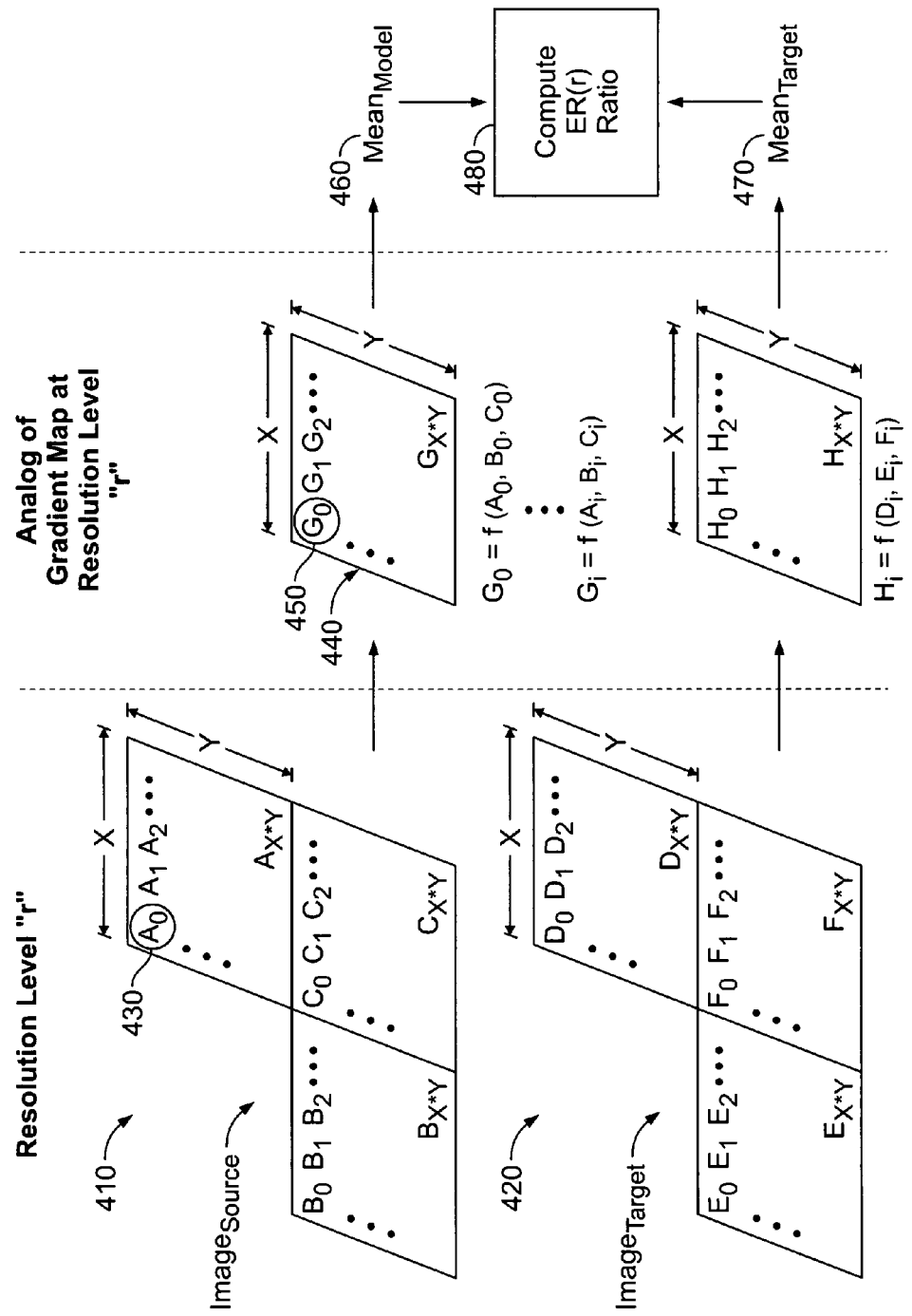
FIG. 4 illustrates determination of a measure of texture for a model image.

FIG. 4 illustrates determination of a measure of texture for a model and target image. An analog of a gradient map for the decomposed model and target image's rth transformation resolution levels, 410 and 420, respectively, is determined. Resolution levels 410 and 420 each have three sub-bands with X*Y number of wavelet coefficients 430. The sub-bands correspond to sub-bands "HL", "LH" and "HH", as discussed for FIGS. 3A and 3B.

The analog of the gradient map 440 is a function of the wavelet coefficients 430, and includes X*Y number of analogs of gradients 450. The analog of the gradient at the rth transformation resolution level and at the ith row and jth column of the analog of the gradient map 440, is determined by using the following formula:

$$\mathrm{round}\left(0.25 * \sqrt{\begin{array}{l} HL(r, i, j) * HL(r, i, j) + LH(r, i, j) * \\ LH(r, i, j) + 2 * HH(r, i, j) * HH(r, i, j) \end{array}}\right)$$

HL(r,i,j) is the wavelet coefficient at the ith row and jth column of sub-band "HL" at the rth transformation resolution level. LH(r,i,j) and HH(r,i,j) are also wavelet coefficients, but at the "LH" and "HH" sub-bands.

Using this formula, the analog of the gradient map is determined for both the transformation resolution levels 410 and 420. These maps allow comparison of the measures of texture between a model image and a target image at a specific resolution level. For example, as discussed earlier, the wrinkles on a face appear only at the higher resolution levels; it is at those resolution levels that small details like wrinkles can be compared.

A ratio ER(r) 480 is used to enhance or suppress the texture in a target image's transformation resolution level 420. ER(r) is determined by first computing means 460 and 470 for the analogs of the gradient maps. The mean value is a function of all the analogs of the gradients at a given resolution level, with the mean corresponding to a model image's transformation resolution level 410 being $\mathrm{Mean}_{model}(r)$, and the mean corresponding to a target image's transformation resolution level 420 being $\mathrm{Mean}_{target}(r)$. Each mean represents a global measure of texture for an image at a transformation resolution level. Using the means 460 and 470, ER(r) is determined, e.g., $\mathrm{Mean}_{model}(r)/\mathrm{Mean}_{target}(r)$.

Alternatively, ER(r) is determined by first performing a histogram match of the model image's local measures of texture at the rth transformation resolution level onto a copy of the target image's local measures of texture at the corresponding transformation resolution level. For each element in the copy of the analog of the gradient map at the rth transformation resolution level for the target image, a ratio is determined based on the value of the element before the histogram match was performed, and the value of the element after the histogram match was performed. The value of ER(r) is determined to be the average of the ratios at the rth transformation resolution level.

In a further alternative, the value of ER(r) is the larger of the value determined by $\text{Mean}_{model}(r)/\text{Mean}_{target}(r)$ or the histogram method.

In some implementations, the determination of ER(r) is based on a pre-determined histogram of a model image, a set of pre-determined $\text{Mean}_{model}(r)$ values, a set of pre-determined ER(r) values, or any combination thereof. If a pre-determined histogram, set of $\text{Mean}_{model}(r)$ values, or a set of ER(r) values is used, only the target image needs to be decomposed.

In some implementations, ER(r) is limited by a threshold (e.g., 2.0 as an upper bound, or 0.5 as a lower bound) to help reduce noise and other less desirable features in the target image from being excessively enhanced. In some implementations, the threshold may be set by the user. In other implementations, the user may modify ER(r) through the use of a slider bar in a graphical user interface. For example, users can slide the bar in one direction to decrease the value of the ER(r) ratio, and slide the bar in the other direction to increase the value of the ER(r) ratio. Using the ER(r) ratio, the measure of texture is applied from the decomposed model image to the decomposed target image (step 240).

Figure 5:
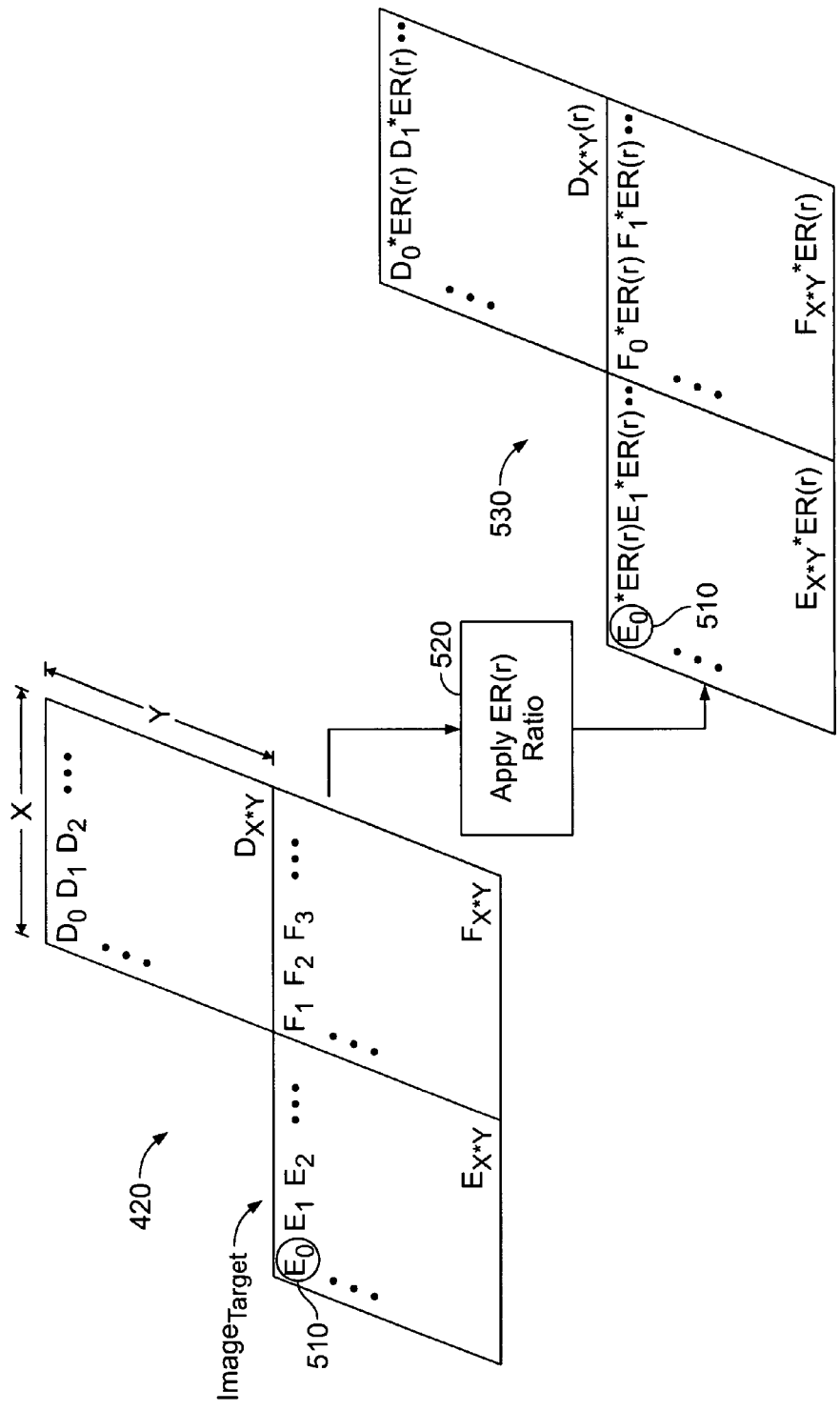
FIG. 5 illustrates the application of a model image measure of texture to a decomposed target image.

FIG. 5 illustrates the application of a model image 110 measure of texture to a decomposed target image, as called for by step 240 of method 200 (see FIG. 2). By way of illustration, the measure of texture is applied for the rth transformation resolution level 420 of the decomposed target image by multiplying the wavelet coefficients 510 with ER(r) 520, resulting in transformation resolution level 530. For example, for the second transformation resolution level, each wavelet coefficient of the sub-bands "2HL", "2LH", and "2HH" of the decomposed target image are multiplied by the ratio ER(2). For each transformation resolution level of the decomposed target image, except the smallest one, the wavelet coefficients are multiplied with the corresponding ER(r).

Figure 6:
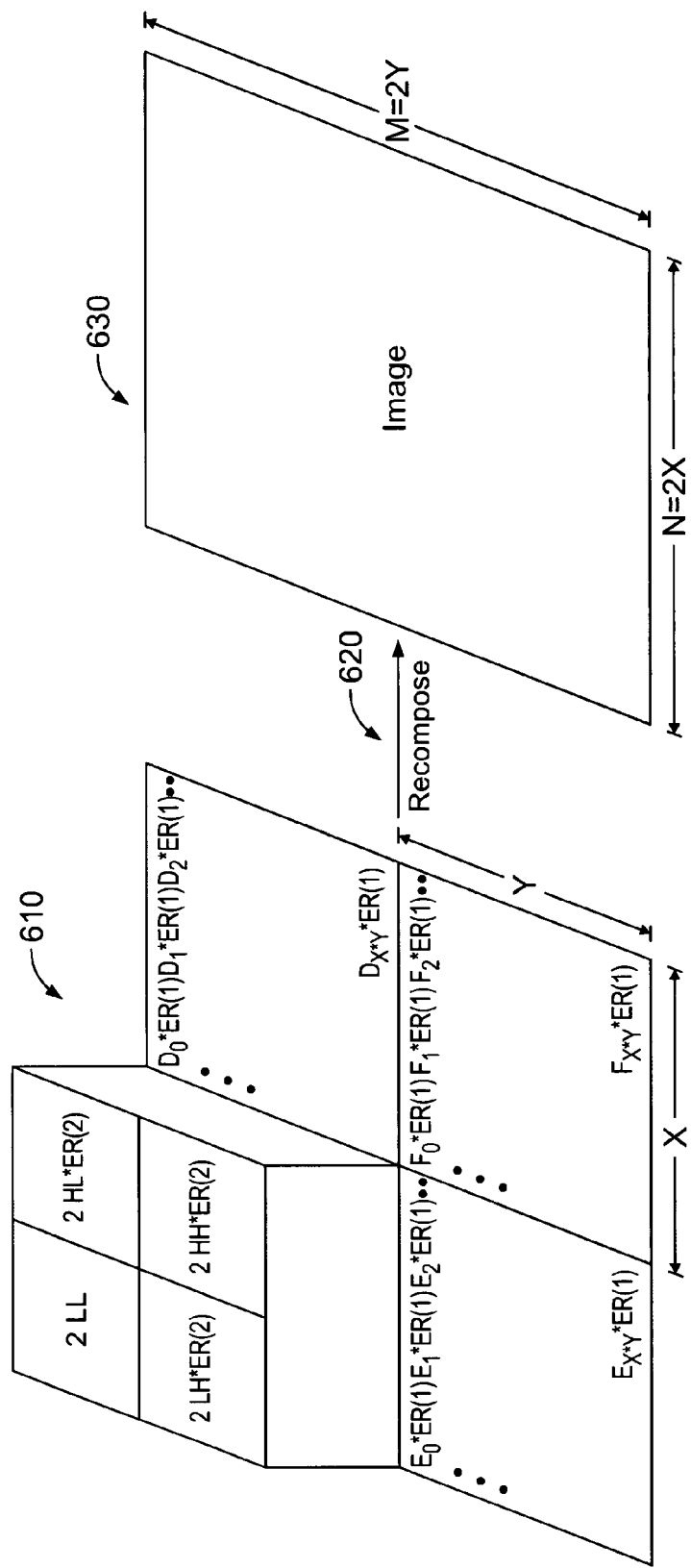
FIG. 6 illustrates re-composition of the modified target image.

FIG. 6 illustrates re-composition of the modified target image. The decomposed target image 610 is recomposed into the resulting image 630, as called for in step 250 of method 200 (see FIG. 2). The modified decomposed target image 610 is recomposed using inverted wavelet transforms 620. In some implementations, the target image was originally in color before it was decomposed. In that case, the method converts the resulting target image 630 back into the color space by using the original chrominance channels of the target image or some other transformation.

In some implementations, the pixel values of the recomposed image are prevented from going beyond the dynamic range through simple clipping (e.g., for a grey-scale range of 0-255, any value greater than 255 would be clipped to make it 255). In other implementations, an image histogram is enforced onto the recomposed image by performing a histogram match of the model image onto the recomposed image. The resulting target image 630 has the look of model image.

Figure 7:
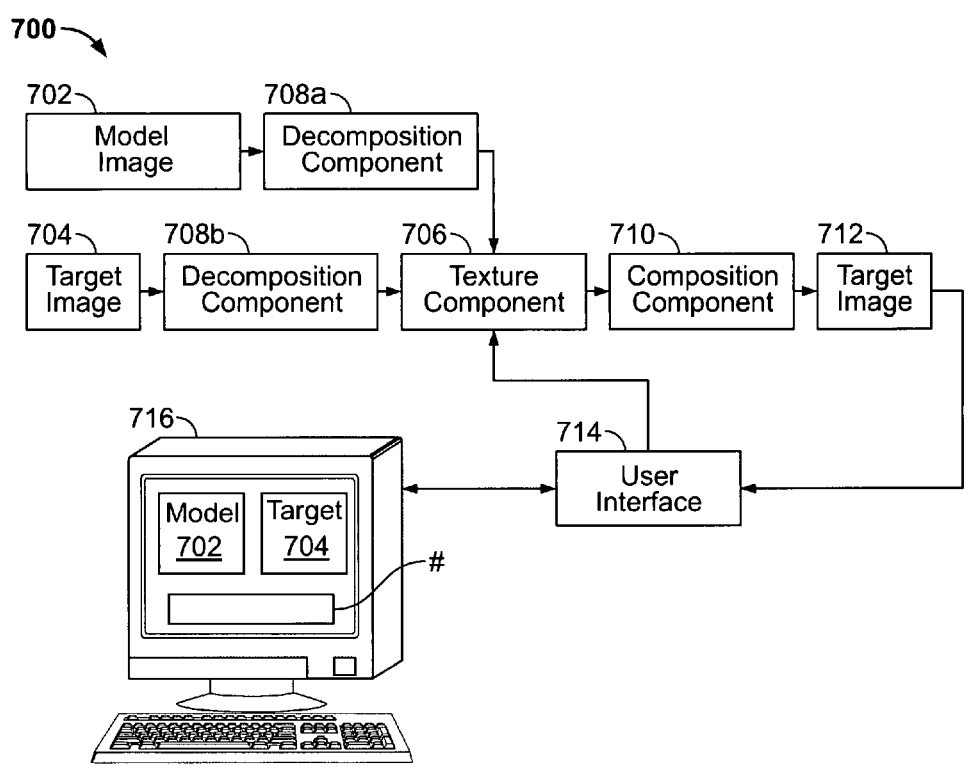
FIG. 7 is a schematic diagram of a system for transferring the look of an image.

FIG. 7 is a schematic diagram of a system 700 for transferring the look of an image. Although several components are illustrated, there may be fewer or more components in the system 700. Moreover, the components can be distributed on one or more computing devices connected by one or more networks or other suitable communication means.

A user can interact with the system 700 through a computer 716 or other device. For example, the computer 716 can be a computer terminal within a local area network (LAN) or wide area network (WAN). In particular, the user may be utilizing the computer system to manipulate an image (e.g., 704). When the user initiates the transfer of the look of a model image 702 to a target image 704, a user interface component 714 receives an indication of such from the computer 716 or a process, for example. The user interface component 714 is responsible for providing a graphical user interface on a display device (e.g., a monitor or a printing device) connected to the computer 716. Upon detection of the initiation of the transfer, a texture component 706 applies a measure of texture from a decomposed model image to a decomposed target image, as described above. The texture component 706 receives the decomposed model and target image from a decomposition component 708a and 708b. The decomposed target image with the applied measure of texture is recomposed by a composition component 710. The composition component 710 provides the resulting image 712 to the user interface component 714. The user interface component 714 causes the resulting image 712 to be presented on the computer 716's display device. Alternatively, the target image 712 can be stored for later processing.

Figure 8:
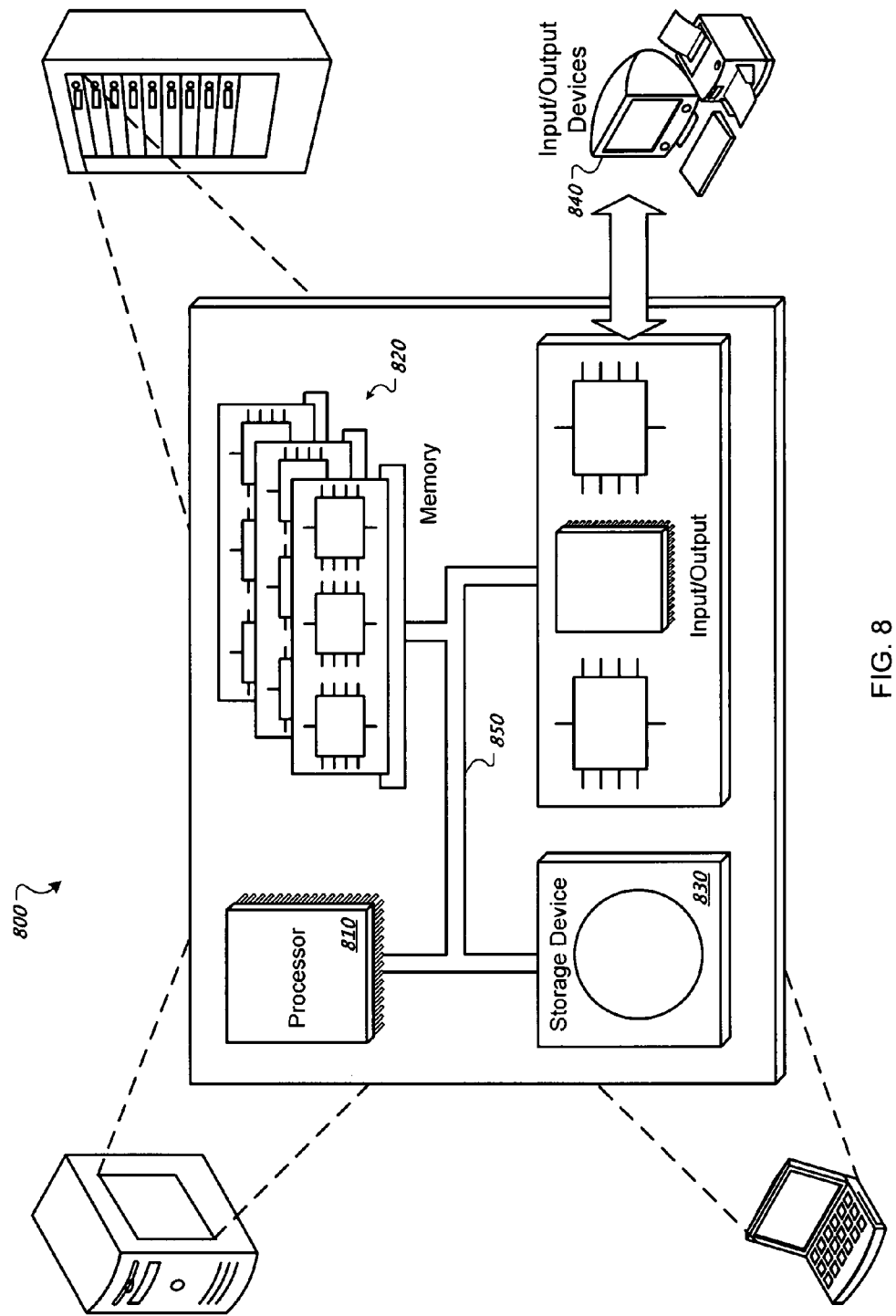
FIG. 8 is a schematic diagram of a generic computer system.

FIG. 8 is a schematic diagram of a generic computer system 800. The system 800 can include a processor 810, a memory 820, a storage device 830, and input/output devices 840. Each of the components 810, 820, 830, and 840 are interconnected using a system bus 850. The processor 810 is capable of processing instructions for execution within the system 800. Such executed instructions can implement one or more components of system 700 and method 200, for example. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 is a computer readable medium such as volatile or non volatile random access memory that stores information within the system 800. The memory 820 could store data structures representing images and transformation resolution levels, for example. The storage device 830 is capable of providing persistent storage for the system 800. The storage device 830 may be a floppy disk device, a hard disk device, an optical disk device, or a tape device, or other suitable persistent storage means. The input/output device 840 provides input/output operations for the system 800. In one implementation, the input/output device 840 includes a keyboard and/or pointing device. In another implementation, the input/output device 840 includes a display unit for displaying graphical user interfaces.

By way of illustration, the above implementations can be utilized in a web-based online service for photo enhancement. By way of further illustration, a single frame of a video can be used as a model to enhance all the frames within a target video. Moreover, the implementations described above can be implemented in hardware (e.g., television, mobile devices, and so on) to enhance video frames or television feeds.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more progammable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method comprising:
decomposing a first image using a first plurality of wavelet transforms, each first wavelet transform creating a first transformation resolution, each first transformation resolution having respective first data;
decomposing a second image using a second plurality of wavelet transforms, each second wavelet transform creating a second transformation resolution, each second transformation resolution having respective second data;
determining a first measure of texture for each first transformation resolution's respective data;
determining a second measure of texture for each second transformation resolution's respective data;
determining a plurality of ratios each based on a first transformation resolution's first measure of texture and a corresponding second transformation resolution's measure of texture, including computing an analog of a gradient map for each second transformation resolution based on the corresponding second transformation resolution's data;
applying each first transformation resolution's first measure of texture to each corresponding second transformation resolution's data, wherein applying each first transformation resolution's first measure of texture to each corresponding second transformation resolution's data comprises applying each ratio to a corresponding second transformation resolution's data; and
recomposing the second image based on the modified second transformation resolutions.

2. The method of claim 1, wherein determining the first measure of texture based on the corresponding first data comprises:
computing an analog of a gradient map based on the corresponding first data; and
computing a mean based on the analog of a gradient map.

3. The method of claim 1, wherein the first data comprises a plurality of wavelet coefficients.

4. The method of claim 1, wherein determining a plurality of ratios comprises:
performing a histogram match of each first transformation resolution's first measure of texture onto a corresponding second transformation resolution's second measure of texture;
for each element of the analog of the gradient map of each second transformation resolution, identifying a first value and a second value, the first value being the value of the element before the histogram match was performed, the second value being the value of the element after the histogram match was performed;
for each first value of each second transformation resolution, computing a ratio based on the first value and on a corresponding second value; and
for each second transformation resolution, computing an average of the corresponding ratios.

5. The method of claim 1, wherein determining a plurality of ratios comprises:
computing a first analog of a gradient map for each first transformation resolution based on the corresponding first transformation resolution's data;
computing a second analog of a gradient map for each second transformation resolution based on the corresponding second transformation resolution's data;
computing a first mean for each first analog of a gradient map;
computing a second mean for each second analog of a gradient map; and
for each first mean, computing a first ratio based on the corresponding first and second means.

6. The method of claim 5, further comprising:
performing a histogram match of each first transformation resolution's first measure of texture onto a corresponding second transformation resolution's second measure of texture;
for each element of the second analog of the gradient map of each second transformation resolution, identifying a first value and a second value, the first value being the value of the element before the histogram match was performed, the second value being the value of the element after the histogram match was performed;
for each first value of each second transformation resolution, computing a second ratio based on the first value and on a corresponding second value;
for each second transformation resolution, computing an average of the corresponding second ratios; and
for each second transformation resolution, selecting the larger of either the corresponding first ratio or the corresponding second ratio.

7. The method of claim 1, wherein recomposing the second image comprises performing a plurality of inverse wavelet transformations of the second transformation resolutions.

8. The method of claim 1, further comprising transferring a global tonal balance from the first image to the second image.

9. The method of claim 1, further comprising:
decomposing a third image using a third plurality of wavelet transforms, each third wavelet transform creating a third transformation resolution, each third transformation resolution having respective third data; and
applying each first transformation resolution's first measure of texture to each corresponding third transformation resolution's data.

10. The method of claim 9, further comprising:
recomposing the third image based on the modified third transformation resolution.

11. A computer program product, encoded on a non-transitory machine readable medium, operable to cause data processing apparatus to perform operations comprising:
decomposing a first image using a first plurality of wavelet transforms, each first wavelet transform creating a first transformation resolution, each first transformation resolution having respective first data;
decomposing a second image using a second plurality of wavelet transforms, each second wavelet transform creating a second transformation resolution, each second transformation resolution having respective second data;
determining a first measure of texture for each first transformation resolution's respective data;
determining a second measure of texture for each second transformation resolution's respective data;
determining a plurality of ratios each based on a first transformation resolution's first measure of texture and a corresponding second transformation resolution's measure of texture, including computing an analog of a gradient map for each second transformation resolution based on the corresponding second transformation resolution's data;
applying each first transformation resolution's first measure of texture to each corresponding second transformation resolution's data, wherein applying each first transformation resolution's first measure of texture to each corresponding second transformation resolution's data comprises applying each ratio to a corresponding second transformation resolution's data; and recomposing the second image based on the modified second transformation resolutions.

12. The computer program product of claim 11, wherein determining the first measure of texture based on the corresponding first data comprises:

computing an analog of a gradient map based on the corresponding first data; and computing a mean based on the analog of a gradient map.

13. The computer program product of claim 11, wherein the first data comprises a plurality of wavelet coefficients.

14. The computer program product of claim 11, wherein determining a plurality of ratios comprises:

performing a histogram match of each first transformation resolution's first measure of texture onto a corresponding second transformation resolution's second measure of texture;

for each element of the analog of the gradient map of each second transformation resolution, identifying a first value and a second value, the first value being the value of the element before the histogram match was performed, the second value being the value of the element after the histogram match was performed;

for each first value of each second transformation resolution, computing a ratio based on the first value and on a corresponding second value; and for each second transformation resolution, computing an average of the corresponding ratios.

15. The computer program product of claim 11, wherein determining a plurality of ratios comprises:

computing a first analog of a gradient map for each first transformation resolution based on the corresponding first transformation resolution's data;

computing a second analog of a gradient map for each second transformation resolution based on the corresponding second transformation resolution's data;

computing a first mean for each first analog of a gradient map;

computing a second mean for each second analog of a gradient map; and for each first mean, computing a first ratio based on the corresponding first and second means.

16. The computer program product of claim 15, where the operations further include:

performing a histogram match of each first transformation resolution's first measure of texture onto a corresponding second transformation resolution's second measure of texture;

for each element of the second analog of the gradient map of each second transformation resolution, identifying a first value and a second value, the first value being the value of the element before the histogram match was performed, the second value being the value of the element after the histogram match was performed;

for each first value of each second transformation resolution, computing a second ratio based on the first value and on a corresponding second value;

for each second transformation resolution, computing an average of the corresponding second ratios; and for each second transformation resolution, selecting the larger of either the corresponding first ratio or the corresponding second ratio.

17. The computer program product of claim 11, wherein recomposing the second image comprises performing a plurality of inverse wavelet transformations of the second transformation resolutions.

18. The computer program product of claim 11, where the operations further include transferring a global tonal balance from the first image to the second image.

19. The computer program product of claim 11, where the operations further include:

decomposing a third image using a third plurality of wavelet transforms, each third wavelet transform creating a third transformation resolution, each third transformation resolution having respective third data; and applying each first transformation resolution's first measure of texture to each corresponding third transformation resolution's data.

20. The computer program product of claim 19, where the operations further include:

recomposing the third image based on the modified third transformation resolution.

21. A system comprising a user input device, a display, a memory device, and a processor programmed to:

decomposing a first image using a first plurality of wavelet transforms, each first wavelet transform creating a first transformation resolution, each first transformation resolution having respective first data;

decomposing a second image using a second plurality of wavelet transforms, each second wavelet transform creating a second transformation resolution, each second transformation resolution having respective second data;

determining a first measure of texture for each first transformation resolution's respective data;

determining a second measure of texture for each second transformation resolution's respective data;

determining a plurality of ratios each based on a first transformation resolution's first measure of texture and a corresponding second transformation resolution's measure of texture, including computing an analog of a gradient map for each second transformation resolution based on the corresponding second transformation resolution's data;

applying each first transformation resolution's first measure of texture to each corresponding second transformation resolution's data, wherein applying each first transformation resolution's first measure of texture to each corresponding second transformation resolution's data comprises applying each ratio to a corresponding second transformation resolution's data; and recomposing the second image based on the modified second transformation resolutions.

22. The system of claim 21, wherein determining the first measure of texture based on the corresponding first data comprises:

computing an analog of a gradient map based on the corresponding first data; and computing a mean based on the analog of a gradient map.

23. The system of claim 21, wherein the first data comprises a plurality of wavelet coefficients.

24. The system of claim 21, wherein determining a plurality of ratios comprises:

performing a histogram match of each first transformation resolution's first measure of texture onto a corresponding second transformation resolution's second measure of texture;

for each element of the analog of the gradient map of each second transformation resolution, identifying a first value and a second value, the first value being the value of the element before the histogram match was performed, the second value being the value of the element after the histogram match was performed;

for each first value of each second transformation resolution, computing a ratio based on the first value and on a corresponding second value; and for each second transformation resolution, computing an average of the corresponding ratios.

25. The system of claim 21, wherein determining a plurality of ratios comprises:

computing a first analog of a gradient map for each first transformation resolution based on the corresponding first transformation resolution's data;

computing a second analog of a gradient map for each second transformation resolution based on the corresponding second transformation resolution's data;

computing a first mean for each first analog of a gradient map;

computing a second mean for each second analog of a gradient map; and for each first mean, computing a first ratio based on the corresponding first and second means.

26. The system of claim 25, where the processor is further programmed to:

perform a histogram match of each first transformation resolution's first measure of texture onto a corresponding second transformation resolution's second measure of texture;

for each element of the second analog of the gradient map of each second transformation resolution, identify a first value and a second value, the first value being the value of the element before the histogram match was performed, the second value being the value of the element after the histogram match was performed;

for each first value of each second transformation resolution, compute a second ratio based on the first value and on a corresponding second value;

for each second transformation resolution, compute an average of the corresponding second ratios; and for each second transformation resolution, select the larger of either the corresponding first ratio or the corresponding second ratio.

27. The system of claim 21, wherein recomposing the second image comprises performing a plurality of inverse wavelet transformations of the second transformation resolutions.

28. The system of claim 21, where the processor is further programmed to transfer a global tonal balance from the first image to the second image.

29. The system of claim 21, where the processor is further programmed to:

decompose a third image using a third plurality of wavelet transforms, each third wavelet transform creating a third transformation resolution, each third transformation resolution having respective third data; and apply each first transformation resolution's first measure of texture to each corresponding third transformation resolution's data.

30. The system of claim 29, where the processor is further programmed to:

recompose the third image based on the modified third transformation resolution.

* * * * *